United States Patent
Bernardo de Oliveira et al.

(10) Patent No.: US 12,244,462 B2
(45) Date of Patent: Mar. 4, 2025

(54) LOGICAL NETWORK RESOURCE ALLOCATION AND CREATION

(71) Applicant: Dell Products L.P., Round Rock, TX (US)

(72) Inventors: Ana Cristina Bernardo de Oliveira, Rio de Janeiro (BR); Anselmo Luiz Eden Battisti, Niteroi (BR); Arthur Albuquerque Zopellaro Soares, Volta Redonda (BR); Debora Christina Muchaluat Saade, Rio de Janeiro (BR); Evandro Luiz Cardoso Macedo, Rio de Janeiro (BR); Flavia Coimbra Delicato, Niteroi (BR); Juan Lucas do Rosario Vieira, Sao Goncalo (BR); Paulo de Figueiredo Pires, Niteroi (BR); Marina Ivanov Pereira Josué, Chiador (BR)

(73) Assignee: Dell Products L.P., Round Rock, TX (US)

( * ) Notice: Subject to any disclaimer, the term of this patent is extended or adjusted under 35 U.S.C. 154(b) by 90 days.

(21) Appl. No.: 17/982,728

(22) Filed: Nov. 8, 2022

(65) Prior Publication Data
US 2024/0163171 A1    May 16, 2024

(51) Int. Cl.
*H04L 41/0893* (2022.01)
*H04L 41/0806* (2022.01)
*H04L 41/0895* (2022.01)

(52) U.S. Cl.
CPC ...... *H04L 41/0893* (2013.01); *H04L 41/0806* (2013.01); *H04L 41/0895* (2022.05)

(58) Field of Classification Search
CPC ......... H04L 41/0893–0895; H04L 41/12–122; H04L 41/342; H04L 41/40
See application file for complete search history.

(56) References Cited

U.S. PATENT DOCUMENTS

2015/0172115 A1* 6/2015 Nguyen .............. H04L 41/0896
                                                    709/226
2019/0149422 A1* 5/2019 Narayanam .............. H04L 41/12
                                                    370/254

(Continued)

OTHER PUBLICATIONS

Alenazi, Mohammed JF, et al. "NFV provisioning in large-scale distributed networks with minimum delay." IEEE Access 8 (2020):151753-151763.*

(Continued)

*Primary Examiner* — Brendan Y Higa
(74) *Attorney, Agent, or Firm* — Ryan, Mason & Lewis, LLP

(57) ABSTRACT

Techniques are provided for logical network resource allocation and creation. One method comprises obtaining a representation of virtualized resources to allocate for a logical network within a physical network, wherein the physical network comprises physical nodes and physical links, wherein the virtualized resources comprise virtual nodes and virtual links, and wherein the physical nodes host one or more virtual nodes and one or more of the physical links host a given virtual link; obtaining a first ordered list of the plurality of virtual nodes; obtaining a second ordered list of the plurality of physical nodes; for a virtual node in the first ordered list: selecting and allocating a physical node from the second ordered list as a host for the virtual node; and allocating a physical path for the virtual links associated with the virtual node. The logical network can be created using the allocated physical nodes and physical links.

20 Claims, 9 Drawing Sheets

(56) References Cited

U.S. PATENT DOCUMENTS

| | | | |
|---|---|---|---|
| 2019/0222511 A1* | 7/2019 | Lokman | H04L 45/586 |
| 2019/0319844 A1* | 10/2019 | Ding | H04L 41/50 |
| 2022/0012105 A1* | 1/2022 | Chagam Reddy | H04L 43/0876 |

OTHER PUBLICATIONS

S. Sahhaf et al., "Scalable Architecture for Service Function Chain Orchestration," 2015 Fourth European Workshop on Software Defined Networks, Bilbao, Spain, 2015, pp. 19-24.*

Chochliouros, Ioannis P. et al. Dynamic network slicing: challenges and opportunities. In: IFIP International Conference on Artificial Intelligence Applications and Innovations. Springer, Cham, 2020. p. 47-60.

Husenovic, Kemal, et al. "Setting the scene for 5g: Opportunities & challenges." International Telecommunication Union 56 (2018).

Sama, Malla Reddy et al. Reshaping the mobile core network via function decomposition and network slicing for the 5G era. In: 2016 IEEE Wireless Communications and Networking Conference. IEEE, 2016. p. 1-7.

Esteves, Jose Jurandir Alves et al. Heuristic for Edge-enabled Network Slicing Optimization using the "Power of Two Choices". In: 2020 16th International Conference on Network and Service Management (CNSM). IEEE, 2020. p. 1-9.

Esteves, José Jurandir Alves et al. Location-based data model for optimized network slice placement. In: 2020 6th IEEE Conference on Network Softwarization (NetSoft). IEEE, 2020. p. 404-412.

\* cited by examiner

Input: $N_v$, SET OF VIRTUAL NODES IN NETWORK SLICE REQUEST

Output: $N'_v$, SET OF VIRTUAL NODES SORTED BY IMPORTANCE

1. FOR EACH VIRTUAL NODE $\bar{n}$ IN $N_v$:
2.     CALCULATE THE SCORE $S(\bar{n})$ OF THE VIRTUAL NODE ACCORDING TO EQUATION (1).
3.     CALCULATE THE IMPORTANCE $I(\bar{n})$ OF THE VIRTUAL NODE ACCORDING TO EQUATION (2).
4. SORT THE VIRTUAL NODES IN $N_v$ BY IMPORTANCE VALUE $I$ IN NON-INCREASING ORDER.
5. SET THE VIRTUAL NODE $r$ WITH HIGHEST $I$ VALUE AS ROOT NODE.
6. TRAVERSE THE GRAPH IN BREADTH FROM $r$, SORTING EACH VIRTUAL NODE BY IMPORTANCE VALUE $I$ IN NON-INCREASING ORDER.
7. RETURN $N'_v$.

FIG. 3

| INPUT: $N$, SET OF PHYSICAL NODES IN THE INFRASTRUCTURE |
|---|
| OUTPUT: $N'$, SET OF PHYSICAL NODES SORTED BY IMPORTANCE |
| 1. FOR EACH PHYSICAL NODE $n$ IN $N$: |
| 2.    CALCULATE THE SCORE $s(n)$ OF THE PHYSICAL NODE ACCORDING TO EQUATION (3). |
| 3.    CALCULATE THE IMPORTANCE $I(n)$ OF THE PHYSICAL NODE ACCORDING TO EQUATION (4). |
| 4. SORT THE PHYSICAL NODES IN $N$ BY IMPORTANCE VALUE $I$ IN NON-INCREASING ORDER. |
| 5. SET THE PHYSICAL NODE $r$ WITH HIGHEST $I$ VALUE AS ROOT NODE. |
| 6. TRAVERSE THE GRAPH IN BREADTH FROM $r$, SORTING EACH PHYSICAL NODE BY IMPORTANCE VALUE $I$ IN NON-INCREASING ORDER. |
| 7. RETURN $N'$. |

FIG. 4

| | |
|---|---|
| INPUT: $G_v$, VIRTUAL NETWORK TOPOLOGY; $f$, MAXIMUM NUMBER OF HOPS | |
| OUTPUT: $M$, THE RESULTING NODE AND LINK MAPPING | |
| 1. | SORT VIRTUAL NODES WITH PROCESS 300 OF FIG. 3. |
| 2. | SORT PHYSICAL NODES WITH PROCESS 400 OF FIG. 4. |
| 3. | WHILE THERE IS A VIRTUAL NODE TO BE ALLOCATED: |
| 4. | IF THE CURRENT VIRTUAL NODE IS THE FIRST IN THE LIST: |
| 5. | MAP THE VIRTUAL NODE TO PHYSICAL NODE WITH THE GREATEST VALUE OF $I(n)$. |
| 6. | ELSE: |
| 7. | GET THE VIRTUAL NODE $p$, WHICH IS THE PARENT NODE OF THE CURRENT VIRTUAL NODE. |
| 8. | GET THE PHYSICAL NODE IN WHICH VIRTUAL NODE $\bar{n}$ IS ALLOCATED. |
| 9. | GET THE PHYSICAL NODES NEIGHBORING $p$, CONSIDERING THE MAXIMUM NUMBER OF HOPS $f$, AS THE CANDIDATE PHYSICAL NODES $C$. |
| 10. | CHOOSE ONE NODE IN $C$, WHICH OWNS THE GREATEST VALUE OF $I$ ON THE PREMISE OF SATISFYING THE CAPACITY REQUIREMENTS. |
| 11. | TRY ALLOCATING THE VIRTUAL NODE. |
| 12. | IF THERE IS NO PHYSICAL NODE TO MAP TO: |
| 13. | RETURN NULL. |
| 14. | SEARCH FOR A PATH BETWEEN $P$ AND $C$ THAT MEETS THE DEMANDS OF LINK RESOURCES |
| 15. | TRY ALLOCATING THE VIRTUAL LINK. |
| 16. | IF THERE IS NO PHYSICAL PATH TO MAP TO: |
| 17. | RETURN NULL. |
| 18. | GET THE NEXT VIRTUAL NODE IN THE LIST. |
| 19. | RETURN THE MAPPING $M$. |

FIG. 5

LOGICAL NETWORK RESOURCE ALLOCATION AND CREATION

FIELD

The field relates generally to information processing systems, and more particularly to resource allocation in such information processing systems.

BACKGROUND

Network function virtualization (NFV) provides flexibility for deploying different network services with specific demands, sharing the infrastructure of a physical network comprising physical nodes and physical links. Such a virtualization of network functionality has led to network slicing techniques that support the creation of isolated logical networks, sometimes referred to as network slices. The logical networks can be tailored to meet the requirements of specific types of services. It can be challenging to identify the physical nodes and the physical links of the physical network that can be used to implement the network resources demanded by a given network slice.

SUMMARY

In one embodiment, a method comprises obtaining a request comprising a representation of a set of virtualized resources to allocate for a logical network within a physical network, wherein the physical network comprises a plurality of physical nodes and a plurality of physical links, wherein the set of virtualized resources for the logical network comprises a plurality of virtual nodes and a plurality of virtual links, and wherein each of the physical nodes hosts one or more virtual nodes and wherein one or more of the physical links host a given virtual link; obtaining a first ordered list of the plurality of virtual nodes based at least in part on a first set of one or more virtual node metrics; obtaining a second ordered list of the plurality of physical nodes based at least in part on a second set of one or more physical node metrics; for at least one virtual node in the first ordered list: selecting one of the plurality of physical nodes from the second ordered list as a host for the at least one virtual node; allocating the selected one of the plurality of physical nodes as the host for the at least one virtual node; and allocating a physical path, comprising one or more physical links, for each of the virtual links associated with the at least one virtual node in accordance with the representation; and initiating a creation of the logical network using the allocated physical nodes and the allocated physical links.

In some embodiments, the representation of the virtualized resources for the logical network comprises an amount of one or more node resource types for each of the plurality of virtual nodes and wherein an amount of virtual node resources allocated in a given physical node does not exceed the amount of available resources in the given physical node. The representation of the virtualized resources for the logical network may comprise an amount of one or more link resource types for each of the plurality of virtual links and wherein an amount of virtual link resources allocated in a given physical link does not exceed an amount of available resources in the given physical link.

In one or more embodiments, the representation of the virtualized resources for the logical network comprises: (i) a designated packet loss amount for each of the plurality of virtual links and wherein a packet loss associated with each of the allocated physical links does not exceed the designated packet loss amount; and/or (ii) a designated propagation delay amount for each of the plurality of virtual links and wherein a propagation delay associated with each of the allocated physical links does not exceed the designated propagation delay amount.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a virtual node sorting process in accordance with an illustrative embodiment;

FIG. 4 illustrates exemplary pseudo code for a physical node sorting process in accordance with an illustrative embodiment;

FIG. 5 illustrates exemplary pseudo code for a process for mapping virtual nodes to physical nodes in accordance with an illustrative embodiment;

DETAILED DESCRIPTION

Figure 1:
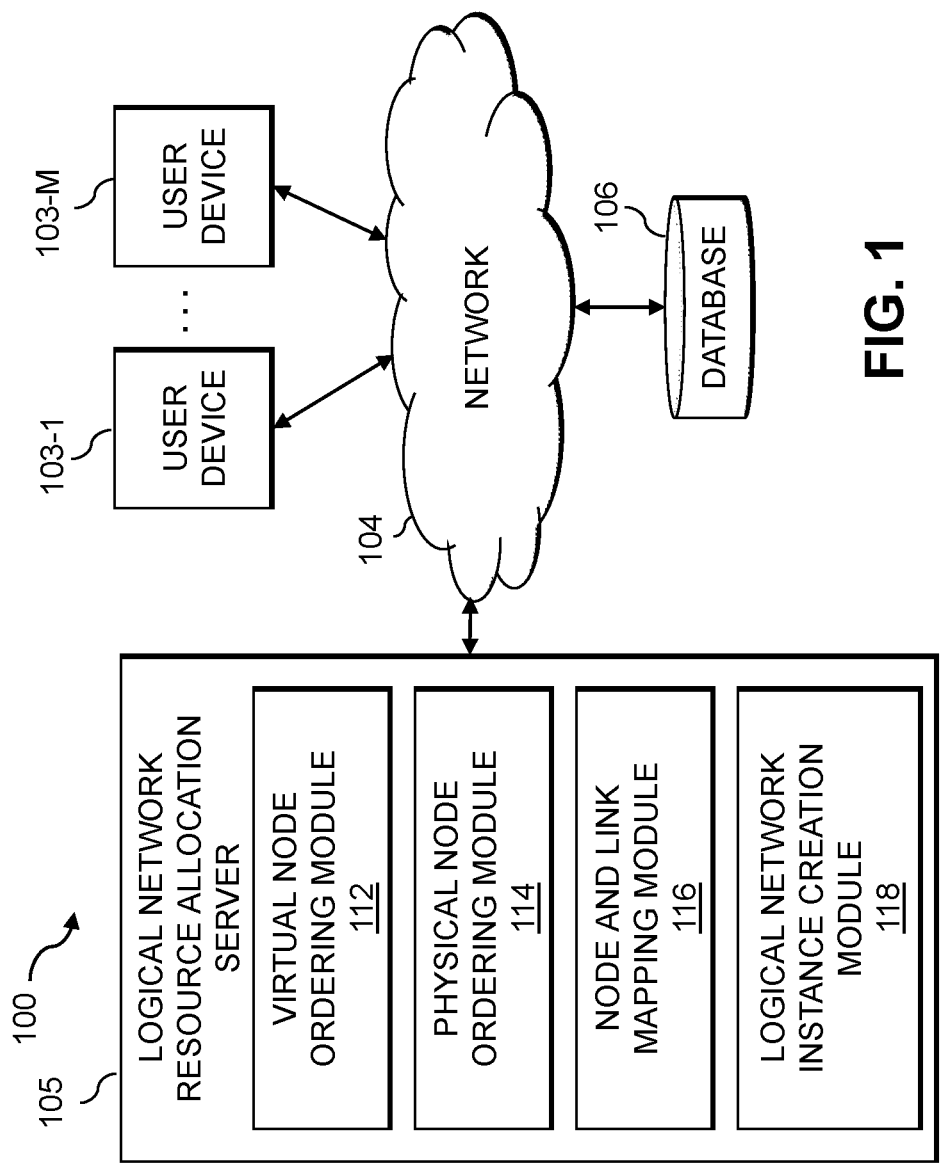
FIG. 1 illustrates an information processing system configured for logical network resource allocation and creation in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for logical network resource allocation and creation.

In one or more embodiments, the disclosed techniques for logical network resource allocation and creation employ a graph-based model, for example, and a heuristic for mapping a network slice demand into a physical infrastructure, taking resource and deployment location requirements into account. The disclosed resource allocation heuristic tackles the challenges arising from the heterogeneity of services and network infrastructure and the need in some embodiments to share as many resources as possible in the creation of network slices.

The disclosed network slice resource allocation and creation techniques, in at least some embodiments, have the following features: (i) an ordering of physical nodes to provide a lower cost allocation of resources; (ii) a deployment of virtual nodes based, for example, on their importance from an infrastructure point of view and a cost of utilization, and (iii) a specification of a network slice (sometimes referred to herein as a logical network), independent of the specific service chains that will be deployed on the network slice, while aiming to improve the potential sharing of infrastructure resources. In at least some embodiments, service chains define a network service comprised of different applications that execute in different network nodes. For example, a firewall may need a combination of functions, such as validation and packet filtering.

Evolving 5G systems, for example, may support three categories of service types (or use cases), as follows:

enhanced mobile broadband (eMBB): supports connections that require high data rates for mobile users;

massive machine type communications (mMTC): supports a high number of IoT (Internet of Things) devices that are sporadically active and transmit small loads of data; and ultra-reliable and low-latency communications (URLLC): provides low latency transmissions of small loads with very high reliability from a limited set of terminals, activated according to patterns usually specified by external events such as alarms.

See, for example, Kemal Husenovic et al., "Setting the Scene for 5G: Opportunities and Challenges," Int'l Telecommunication Union 56 (2018), incorporated by reference herein in its entirety.

5G networks, for example, aim to satisfy the different network requirements of each service type, and employ the concept of network slicing, providing programmability and modularity for network resource provisioning. Network slices can be created to offer specific network capabilities and network characteristics for each type (e.g., class) of service, thus overcoming a one-size-fits-all approach typically adopted by monolithic mobile networks of previous generations. Network slicing enables abstracting physical and/or virtual infrastructure resources, such as computation, network, memory, and storage, offering logical resources, for example, with customized policy and configuration parameters.

The concretization of the network slicing paradigm involves a set of issues that include the description of a network slice requirement and the deployment of a network slice instance. A network slice instance is created based on a network slice template. The network slice template is a complete description of the structure and configuration for instantiating and controlling the network slice instance during its life cycle. Several entities may be involved in network slicing: an infrastructure provider, a virtual network operator (VNO) and an application service provider, for example. The infrastructure provider is responsible for providing and managing the entire physical infrastructure and providing information about the physical components owned by the infrastructure provider. This physical infrastructure can be leased by a VNO to build virtual network slices over the network. Application service providers use the network slices provided by the VNO to supply a set of service function chains (SFC) to their customers.

The life cycle of a network slice instance may be divided into four phases: preparation, commissioning, operation, and decommissioning. See, e.g., Ioannis P. Chochliouros et al., "Dynamic Network Slicing: Challenges and Opportunities," IFIP Int'l Conf. on Artificial Intelligence Applications and Innovations, 47-60 (June 2020). In the preparation phase, the service provider provides the VNO with the service requirements (e.g., a number and types of devices to be connected, application type, required reliability and response time). Based on those requirements, the VNO specifies application quality of service (QoS) requirements in terms of network performance metrics, such as network latency, packet loss rate, and bandwidth. Finally, the VNO specifies the network slice resource demands, through a network slice resource demand (NSRD) graph or a textual representation. The NSRD graph or textual representation specify the network slice topology, the resources required by each virtual node that compose the network slice (e.g., required CPU, memory RAM and disk) and the virtual links. In addition to the resource demand, a network slice may be characterized by its service level agreement (SLA) and geographic coverage constraints.

The commissioning phase of a network slice instance uses the NSRD graph or textual representation as an input parameter for the network slice resource allocation process. In this phase, the virtual topology is mapped into the physical network provided by the infrastructure provider. After this phase, the network slice instance is created and is ready for the operation phase. The operation phase of a network slice instance comprises tasks such as activation of the network slice instance and continuous monitoring of the instance. In addition, some tasks can be performed in the operation phase to update the instance, reconfigure the instance, change the instance topology, associate and disassociate network roles, and/or scale the instance. Finally, in the decommissioning phase of a network slice instance, network slice dedicated resources are released. After this phase, the network slice instance ceases to exist.

Due to limited network resources and increasingly diversified network services, it can be challenging to efficiently provision network resources to network slices with different QoS requirements. Moreover, the heterogeneous nature of 5G networks also adds complexities to resource allocation. One or more embodiments of the disclosure provide network slice resource allocation techniques that address at least some of these challenges.

The process of network slice resource allocation aims to map network slice nodes (e.g., virtual nodes) to physical network nodes that satisfy one or more requirements in terms of resources and/or deployment location. In addition, the network slice resource allocation process may aim to map network slice links (e.g., virtual links) onto physical paths (comprising, e.g., one or more physical links) that meet the bandwidth and/or packet loss requirements. A request for a network slice creation may only be accepted in some embodiments if the requirements of all virtual nodes and virtual links of the network slice are satisfied; otherwise, the request should be rejected. In at least some embodiments, the disclosed techniques for logical network resource allocation and creation encompass a graph-based system model and an algorithm.

While one or more embodiments of the disclosure may be described in the context of network slices in 5G networks (e.g., one or more 5G application scenarios with a focus on solving the network slice resource allocation problem), the disclosed techniques for logical network resource allocation and creation may be employed in any network that supports logical networks (e.g., network slices), as would be apparent to a person of ordinary skill in the art.

One or more aspects of the disclosure recognize that the network slice resource allocation task, in some embodiments, comprises mapping virtual nodes to physical network nodes that satisfy the resource and/or deployment location requirements. Furthermore, the network slice resource allocation task may map network slice links onto physical network paths that meet the requested bandwidth and/or packet loss requirements. A request to create a network slice is only accepted in some embodiments if the requirements of all nodes and links of the network slice are satisfied; otherwise, the request is rejected. The network slice resource allocation task may involve the following entities: (i) a network slice demand (e.g., expressed as a NSRD graph) that defines the virtual network topology requested by a service provider; (ii) network slice instances that are the network slices executing in the 5G environment based on a network slice template, for a specific service type (e.g., eMBB, mMTC or URLLC); and (iii) an infrastructure network (e.g., a physical substrate network) that provides computational and communication resources to deploy such network slice instances. This may be a non-trivial problem due to the high heterogeneity and dynamism of the available resources of the entities.

Considering the aforementioned context, one or more embodiments of the disclosure address the following challenges: (i) heterogeneity and dynamism of physical network infrastructure and of requested services; and (ii) sharing of network slice resources between different service instances, as discussed hereinafter.

A solution for resource allocation in network slices takes into account at least two aspects of heterogeneity, in at least some embodiments: heterogeneity in the required services and heterogeneity in the infrastructure of the network. In the resource allocation process for creating network slices, the virtual resources are mapped into physical network components. This mapping is typically done considering the requirements of the services that will use the network slice. 5G networks are expected to support a wide variety of services, often with different requirements. The process of creating a network slice that aims to meet bandwidth-intensive applications considers different factors than the process of creating a network slice that demands high reliability and ultra-low latency. Dealing with this heterogeneity of requirements in the resource allocation process is not trivial, demanding a consideration of different constraints and the customization and weighting of variables in the solution model. The physical network comprises physical nodes with heterogeneous computational resources and physical links that connect these nodes. A physical node can be a computing node capable of executing one or more virtual network functions (VNFs), an access node through which the user will access the network, or a network switch node.

The service quality of a network slice, as well as the revenue of the network slice provider, may depend on the choice of physical nodes that should be provisioned for the network slice. In a physical network, physical nodes have different capacities that should be considered in some embodiments when selecting the nodes to be used for allocating a network slice. In some cases, the physical node with the highest capacity may also be the node with the highest cost of use, and thus, selecting nodes by capacity may lead to a higher network slice deployment cost. In at least some embodiments of the disclosure, an efficient resource allocation is considered to be a resource allocation that meets the network slice requirements, using the infrastructure resources with, for example, the lowest financial cost of deployment. This is a non-trivial problem since when reducing the cost, it may not be able to meet the demands of the network slice user. Thus, it is necessary to find a cost-benefit tradeoff during the network slice resource allocation phase.

5G networks are envisioned as a means to give rise to a wide range of vertical industries with very diverse and stringent service requirements. The network slice management of virtualized resources is being regarded as an important pillar for the 5G infrastructure to be able to meet this diversity of services. The network slicing concept enables sharing the physical network into multiple virtual networks, each one tailored and optimized for a specific class of application or service, for example. In this manner, a network slice can be considered a virtual network that is created on top of a physical network. This characteristic gives the illusion to the network slice tenant of operating its own dedicated physical network.

One or more aspects of the disclosure recognize that a network slice tenant renting the infrastructure to deploy different service function chains, not known at the design phase, provides a promising approach. Therefore, the creation of the network slice is independent, in some embodiments, of the service chains deployed in the network slice and is more general than the VNF placement problem. In this approach, the infrastructure sharing between different tenants enabled by network slicing may decrease the costs of operating the virtual network, that will be shared among different users.

To address such challenges, one or more embodiments of the disclosure provide for network slice resource allocation and creation, by providing:

- a graph-based approach, for example, that models the network slice resource allocation problem in a 5G environment;
- an ILP (Integer Linear Programming) optimization model to solve the network slice resource allocation problem; and
- a heuristic that maps the virtual nodes into physical nodes and the virtual links into a path in the physical network considering a node importance order (e.g., to overcome the scalability issue of the ILP model).

Network slice resource allocation can be addressed in some embodiments, as follows:

Given: a network slice demand represented by a virtual graph $G_v=\{N_v, L_v\}$ (or another representation) to be allocated in an infrastructure network represented by a graph $G_p=\{N \cup Q, L \cup L_q\}$, Find: in that node $n \in N$ to allocate each virtual node $\bar{n} \in N_v$; and that physical link $l_{ab} \in L$ to allocate each virtual link $l_{\overline{ab}} \in L_v$, Subject to: available resource capacity on physical nodes and available bandwidth capacity on physical links; providing a connected path between the allocated nodes; and a geographic coverage requirement of the network slice demand.

Objective: reduce (e.g., minimize) the infrastructure cost to host the network slice demand, that is calculated based on the type and amount of resource allocated for the network slice.

The disclosed model, in some embodiments, defines a node resource, for example, as a central processing unit (CPU), a random access memory (RAM) and/or a disk capacity. In addition, each link can be characterized by its bandwidth and buffer resources. The parameters to model the infrastructure network and the parameters to specify the network slice demand are discussed further below.

Consider an infrastructure network (e.g., a physical substrate network), managed by an infrastructure provider, that is represented, for example, by a directed graph $G_p=(N \cup Q, L \cup L_q)$, where N is a set of internal physical nodes n ($n \in N$) that can allocate virtual nodes, Q is a set of access physical nodes q ($q \in Q$), L is a set of infrastructure links, and $L_q$ is a set of access links. The physical nodes have a set of resources of type $i \in I=\{CPU, RAM, Disk\}$ that are characterized by their availability, $a^i(n)$. A cost for a unit of resource of type i in physical node n may be expressed as $c^i(n)$.

Moreover, physical links $l_{ab}$ ($l_{ab} \in L$) between physical nodes $a \in N$ and $b \in N$ comprise a set of resources of type $k \in K=\{Bandwidth, Buffer\}$ that are characterized by their availability $a^k(l_{ab})$. An access link $l_{qa}$ ($l_{qa} \in L_q$) is between an access node $q \in Q$ and a physical node $a \in N$. Finally, such links are characterized by two parameters: $a^{loss}(l_{ab})$ and $a^{delay}(l_{ab})$, related to the packet loss rate and propagation delay, respectively, of a given link. A cost for a unit of resource of type k in physical link $l_{ab}$ may be expressed as $c^k(l_{ab})$.

A network slice can be built over the physical network and requires a set of virtual resources represented by, for example, a directed graph $G_v=(N_v, L_v)$. A virtual node $\bar{n} \in N_v$ requires a specific quantity of each type of resource $i \in I=\{CPU, RAM, Disk\}$, defined by $r^i(\bar{n})$. Each virtual link $l_{\overline{ab}} \in L_v$ requires, for example, a minimal quantity for each type of resource $k \in K=\{Bandwidth, Buffer\}$, defined by $r^k(l_{\overline{ab}})$. Virtual links may require a maximum accepted packet loss rate $r^{loss}$ and propagation delay $r^{delay}$.

The problem of resource allocation for network slices can be represented in some embodiments by mapping the physical network graph and the network slice request graph. The mapping is constrained in one or more embodiments to the resource capabilities of the physical nodes and the network slice coverage area. In addition, a virtual link can be mapped to a physical link or a path comprised of several physical links.

A network slice may be characterized by a virtual network topology, expressed as a virtual graph, $G_v=(N_v, L_v)$ or another representation. A virtual node may be expressed as $\bar{n} \in N_v$. A virtual link may be expressed as $l_{\overline{ab}} \in L_v$. A virtual node $\bar{n}$ required resource of type i may be expressed as $r^i(\bar{n})$. A virtual link $l_{\overline{ab}}$ required resource of type k may be expressed as $r^k(l_{\overline{ab}})$. A virtual link may require, for example, a maximum packet loss rate, expressed as $r^{loss}$, and a required maximum propagation delay, expressed as $r^{delay}$.

In at least some embodiments, there are five binary decision variables, as follows.

$$x\frac{n}{\bar{n}} \in \{0, 1\}, \forall \bar{n} \in N_v, \forall n \in N:$$

equals 1 if the virtual node $\bar{n} \in N_v$ is mapped into the physical node $n \in N$, 0 otherwise;

$$y\frac{ab}{\overline{ab}} \in \{0, 1\}, \forall l_{\overline{ab}} \in L_v, \forall l_{ab} \in L:$$

equals 1 if the virtual link $l_{\overline{ab}} \in L_v$ is mapped into physical link $l_{ab} \in L$, 0 otherwise;

$z_n$, $\forall n \in N$: equals 1 if the physical node $n \in N$ was assigned to at least one virtual node of $N_v$, 0 otherwise;

$w_{cd}^q$, $\forall (c, d) \in L \cup L_q$, $\forall q \in Q$: equals 1 if the link $l_{cd} \in L \cup L_q$ is in the path that connects $q \in Q$ to $G_v$, 0 otherwise; and $t_n^q$, $\forall n \in N$, $\forall q \in Q$: equals 1 if the physical node $n \in N$ is the last node of the path that connects $q \in Q$ to $G_v$, 0 otherwise.

In one or more embodiments, a set of constraints are grouped as follows:

Virtual Nodes:

allocated virtual node resources in a physical node cannot exceed an amount of available resources in the physical node:

$$\sum_{\bar{n} \in N_v} x\frac{n}{\bar{n}} \cdot r^i(\bar{n}) \leq a^i(n), \forall n \in N, \forall i \in I;$$

and each virtual node is allocated in exactly one physical node:

$$\sum_{n \in N} x\frac{n}{\bar{n}} = 1, \forall \bar{n} \in N_v.$$

Virtual Links:

allocated virtual link resources in a physical link cannot exceed an amount of available resources in the physical link:

$$\sum_{l_{\overline{ab}}} y\frac{ab}{\overline{ab}} \cdot r^k(l_{\overline{ab}}) \leq a^k(l_{ab}), \leq l_{ab} \in L, \leq k \in K;$$

a packet loss of each allocated physical link cannot exceed a maximum loss of a virtual link:

$$y\frac{ab}{\overline{ab}} \cdot a^{loss}(l_{ab}) \leq r^{loss}, \forall l_{ab} \in L, \forall l_{\overline{ab}} \in L_v;$$

a sum of allocated physical link delays cannot exceed a maximum delay of a virtual link:

$$\sum_{l_{ab} \in L} y\frac{ab}{\overline{ab}} \cdot a^{delay}(l_{ab}) \leq r^{delay}, \forall l_{\overline{ab}} \in L_v;$$

and each virtual link is allocated to at least one physical link:

$$\sum_{l_{ab} \in L} y\frac{ab}{\overline{ab}} \geq 1, \forall l_{\overline{ab}} \in L_v.$$

Connected Path:

physical links assigned to a virtual link are a connected path, as follows:

$$\sum_{l_{nb} \in L} y\frac{nb}{\overline{ab}} - \sum_{l_{an} \in L} y\frac{an}{\overline{ab}} = x\frac{n}{\bar{a}} - x\frac{n}{\bar{b}}, \forall n \in N, \forall l_{\overline{ab}} \in L_v;$$

and one direction of the physical link can be assigned to the path that comprises the virtual link, as follows:

$$y\frac{ab}{\overline{ab}} + y\frac{ba}{\overline{ab}} \leq 1, \forall l_{ab} \in L, \forall l_{\overline{ab}} \in L_v.$$

Coverage for Allocated Virtual Nodes:

Set $z_n=1$, when a physical node $n \in N$ is assigned to at least one virtual node:

$$z_n \geq x\frac{n}{\bar{n}}, \forall n \in N, \forall \bar{n} \in N_v, \text{ and}$$

$$z_n \leq \sum_{\bar{n} \in N_v} x\frac{n}{\bar{n}}, \forall n \in N.$$

Coverage from Access Node to Virtual Nodes:

at most, one arc can arrive in a physical node in the path of $q \in Q$, as follows:

$$\sum_{\substack{l_{cn} \in L \cup L_q, \\ c \in N \cup \{q\}}} w_{cn}^q \leq 1, n \in N, \forall q \in Q;$$

and $t_n^q = 1$ only if the physical node has at least one virtual node and is the last physical node in the path of $q \in Q$. That is, $t_n^q$ is 1 only when both terms are 1, as follows:

$$t_n^q = z_n \sum_{\substack{l_{cn} \in L \cup L_q, \\ c \in N \cup \{q\}}} w_{cn}^q, \forall n \in N, \forall q \in Q;$$

It is noted that in order to solve the above equation linearly, given that $$\alpha = t_n^q;$$
$$\beta = z_n; \text{ and}$$
$$\gamma = \sum_{\substack{l_{cn} \in L \cup L_q, \\ c \in N \cup \{q\}}} w_{cn}^q.$$

In the domain $\forall n \in N, \forall q \in Q$, the following additional constraints may be present:

$\alpha \leq \beta$, $\alpha \leq \gamma$, and $\alpha \geq \beta + \gamma - 1$.

One physical link from the access node can be chosen in the path, as follows:

$$\sum_{l_{qd} \in L_q} w_{qd}^q = 1, \forall q \in Q;$$

The path from the access node to a physical node that has a virtual node is a connected path, as follows:

$$\sum_{l_{nb} \in L} w_{nb}^q - \sum_{\substack{l_{cn} \in L \cup L_q, \\ c \in N \cup \{q\}}} w_{cn}^q = -t_n^q, \forall q \in Q, \forall n \in N; \text{and}$$

$$w_{ab}^q + w_{ba}^q \leq 1, \forall l_{ab} \in L.$$

An objective function reduces (e.g., minimizes) the infrastructure cost to host a network slice, calculated based on the type and amount of resource allocated for the network slice, as follows:

$$\min \sum_{n \in N} \sum_{\bar{n} \in N_v} \sum_{i \in I} x\frac{n}{\bar{n}} \cdot r^i(\bar{n}) \cdot c^i(n) + \sum_{l_{ab} \in L} \sum_{l_{\overline{ab}} \in L_v} \sum_{k \in K} y\frac{ab}{\overline{ab}} \cdot r^k(l_{\overline{ab}}) \cdot c^k(l_{ab}).$$

In some embodiments, a heuristic is provided for solving the resource allocation problem for network slices. A network slice demand is comprised of virtual nodes and virtual links. Allocating virtual nodes means selecting the physical nodes of the network infrastructure as hosts for the virtual nodes in a network slice demand under the condition of satisfying the capacity requirements. In this process, virtual nodes are allocated one after another. It can be shown that ordering the virtual nodes in the node mapping provides a better performance in terms of resource efficiency and acceptance ratio. In this manner, the disclosed heuristic-based solution considers the topological characteristics of nodes and their resources to choose a node to be allocated first.

Virtual nodes may contain different resource demands, such as CPU, RAM and disk storage. Nodes with higher degree and betweenness are frequently used, and many shortest paths pass through them. In this manner, the disclosed heuristic uses the node demands, the degree, and the betweenness of nodes to choose an order to map the virtual nodes. In the physical infrastructure, physical nodes are connected using physical links that contain some characteristics such as available bandwidth, propagation delay and packet loss. The distance from the physical node to the network access point can influence the network access delay. As physical nodes have different characteristics from the virtual nodes, the heuristic uses different methods to order physical and virtual nodes.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more logical network resource allocation servers 105 and one or more databases 106, discussed below.

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (StaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary logical network resource allocation server 105 may comprise a virtual node ordering module 112, a physical node ordering module 114, a node and link mapping module 116 and a logical network instance creation module 118. In some embodiments, the virtual node ordering module 112 sorts the virtual nodes associated with a given logical network instance, as discussed further below in conjunction with FIG. 3, for example. The physical node ordering module 114 sorts the physical nodes associated with a given logical network instance, as discussed further below in conjunction with FIG. 4, for example. The node and link mapping module 116 maps virtual nodes to physical nodes, as discussed further below in conjunction with FIG. 5, for example.

It is to be appreciated that this particular arrangement of elements 112, 114, 116, 118 illustrated in the logical network resource allocation server 105 of the FIG. 1 embodiment is presented by way of example only, and alternative arrangements can be used in other embodiments. For example, the functionality associated with elements 112, 114, 116, 118 in other embodiments can be combined into a single element, or separated across a larger number of elements. As another example, multiple distinct processors can be used to implement different ones of elements 112, 114, 116, 118 or portions thereof.

At least portions of elements 112, 114, 116, 118 may be implemented at least in part in the form of software that is stored in memory and executed by a processor. An exemplary process utilizing elements 112, 114, 116, 118 of the logical network resource allocation server 105 in computer network 100 will be described in more detail with reference to FIGS. 2 through 4.

Other logical network resource allocation servers 105 (not shown in FIG. 1), if any, are assumed to be configured in a manner similar to that shown for logical network resource allocation server 105 in the figure.

The logical network resource allocation server 105 may be implemented, for example, on the cloud, such as a private cloud, or on the premises of an enterprise or another entity. In some embodiments, the logical network resource allocation server 105, or portions thereof, may be implemented as part of a host device.

Additionally, the logical network resource allocation server 105 can have an associated database 106 configured to store, for example, network information related to one or more physical networks, one or more logical network instances, and/or one or more logical network demands.

The database 106 in the present embodiment is implemented using one or more storage systems associated with the one or more logical network resource allocation servers 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user devices 103 and/or logical network resource allocation servers 105 may be implemented on a common processing platform, or on separate processing platforms. The one or more user devices 103 may be configured to interact over the network 104 in at least some embodiments with the one or more logical network resource allocation servers 105, for example.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and/or logical network resource allocation servers 105 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Also associated with the one or more user devices 103 and/or logical network resource allocation servers 105 can be one or more input-output devices (not shown), which illustratively comprise keyboards, displays or other types of input-output devices in any combination. Such input-output devices can be used, for example, to support one or more user interfaces to the logical network resource allocation servers 105, as well as to support communication between the logical network resource allocation servers 105 and other related systems and devices not explicitly shown.

The one or more user devices 103 and/or logical network resource allocation servers 105 in the FIG. 1 embodiment are assumed to be implemented using at least one processing device. Each such processing device generally comprises at least one processor and an associated memory, and implements one or more functional modules for controlling certain features of the respective device.

More particularly, the one or more user devices 103 and/or logical network resource allocation servers 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises RAM, read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more user devices 103 and/or logical network resource allocation servers 105 to communicate in some embodiments over the network 104 with each other (as well as one or more other networked devices), and illustratively comprises one or more conventional transceivers.

It is to be understood that the particular set of elements shown in FIG. 1 for logical network resource allocation and creation is presented by way of illustrative example only, and in other embodiments additional or alternative elements may be used. Thus, another embodiment includes additional or alternative systems, devices and other network entities, as well as different arrangements of modules and other components.

Figure 2:
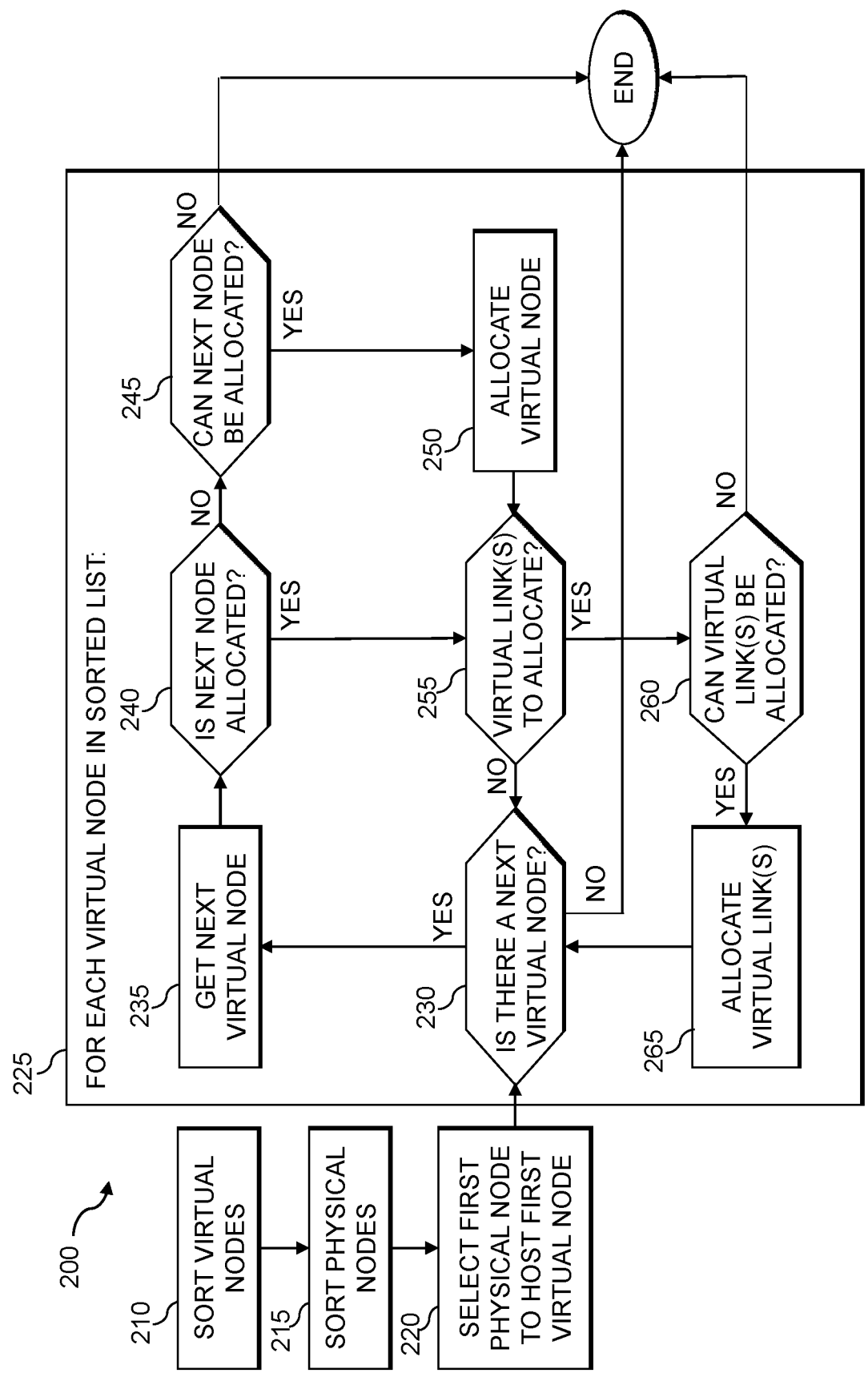
FIG. 2 is a flow chart illustrating an exemplary implementation of a process for allocating resources for a logical network in accordance with an illustrative embodiment.

FIG. 2 is a flow chart illustrating an exemplary implementation of a process 200 for allocating resources for a logical network in accordance with an illustrative embodiment. The process 200 employs a resource allocation heuristic. In some embodiments, the disclosed heuristic encompasses three steps, namely: (i) a virtual node ordering in step 210, as discussed further below in conjunction with FIG. 3; (ii) a physical node ordering in step 215, as discussed further below in conjunction with FIG. 4; and (iii) a node and link mapping loop 225, as discussed further below in conjunction with FIG. 5.

The virtual nodes represent the network resources that should be allocated to serve a network slice request. The virtual node ordering in step 210 can employ, for example, a relevance of a virtual node that is based at least in part on its requirements of computational resources and links. Two equations are employed in step 210, as discussed further below, with equation (1) being used to assign a score for each virtual node based on the resources a given virtual node ($\bar{n}$) demands, and with equation (2) giving an importance value, $I(\bar{n})$, for each virtual node based on its score, degree, and centrality, for example.

The score, $S(\bar{n})$, of a given virtual node $\bar{n}$ is based in some embodiments on the resources demanded by the virtual node. The score of each virtual node can be calculated, for example, by adding all node-based resources requested by the virtual node, considering the resource demand of all links passing through the virtual node, as follows:

$$S(\bar{n}) = \left(\sum_{i \in I} r^i(\bar{n})\right) + \sum_{l_{\bar{n}\bar{b}} \in L_v} \sum_{k \in K} r^k(l_{\bar{n}\bar{b}}) \quad (1)$$

The importance of each virtual node can be calculated based on the score of the related node multiplied by the average between the node degree, $d_{\bar{n}}$, and the centrality, $b_{\bar{n}}$, of the node, as follows:

$$I(\bar{n}) = S(\bar{n}) \cdot \left(\frac{d_{\bar{n}} + b_{\bar{n}}}{2}\right) \quad (2)$$

The node degree, $d_{\bar{n}}$, represents the number of edges (number of neighbors) that connect to a given virtual node, $\bar{n}$, reflecting a level of influence. The betweenness, $b_{\bar{n}}$, quantifies how much a virtual node, $\bar{n}$, is found between the path linking other pairs of nodes, and can be expressed as a number of shortest paths that pass through the virtual node. In other embodiments, one or more alternative ordering criteria, with different parameters, may be employed.

The physical node ordering in step 215 employs an algorithm that assigns a score for each physical node based on its available resources and costs. Two equations are employed in step 215, discussed below, with equation (3) being used to calculate a physical node score, and with equation (4) being used to calculate an importance value for each physical node based on its score, degree, and centrality.

The score of each physical node is calculated in step 215 using equation (3) by adding the inverse of the number of hops of each node to an access node, adding each node-based available resource divided by its unit cost, adding each link-based available resource divided by its unit cost, and adding the inverse of each link's loss and delay. In the first part of the score calculation, physical nodes with a better cost/benefit ratio receive higher scores. The second part of equation (3) assigns scores with lower values to the nodes, whose links to access the node, present a higher loss rate and propagation delay.

$$S(n) = \frac{1}{h_n} + \left(\sum_{i \in I} \frac{a^i(n)}{c^i(n)}\right) + \sum_{l_{nb} \in L \cup L_q}\left(\left(\sum_{k \in K} \frac{a^k(l_{nb})}{c^k(l_{nb})}\right) + \frac{1}{a^{loss}(l_{nb}) + a^{delay}(l_{nb})}\right) \quad (3)$$

where:
  $h_n$ is the number of hops in the shortest path from physical node n to the access node;
  S(n) is the physical node n score, based on its available resources and costs; and
  I(n) is the physical node n importance, based on its score, degree and centrality.

The importance of each physical node is calculated using equation (4) based on the score of the related node multiplied by the average between the degree and the centrality of the node.

$$I(n) = S(n) \cdot \left(\frac{d_n + b_n}{2}\right) \quad (4)$$

where:
- $d_n$ is the degree (e.g., number of neighbors) of a physical node n; and
- $b_n$ is the centrality (e.g., number of shortest paths that pass through the node) of a physical node n.

A first physical node (e.g., a most important physical node) is selected in step 220 from the ordered list of step 215, and a first virtual node (e.g., a most important virtual node) is selected in step 220 from the ordered list of step 210.

As shown in FIG. 2, the node and link mapping performed in loop 225 comprises, for each virtual node in the ordered list from step 210, a test is performed in step 230 to determine if there is a next virtual node (e.g., a current virtual node processed for a given iteration of the loop 225) to process from the ordered list of step 210. If it is determined in step 230 that there is a next virtual node to process, program control proceeds to step 235 to obtain the next virtual node. If it is determined in step 230 that there is no next virtual node to process, program control ends.

A test is performed in step 240 to determine if the next virtual node is already allocated. If it is determined in step 240 that the next virtual node is already allocated, then program control proceeds to step 255. If it is determined in step 240 that the next virtual node is not yet allocated, program control proceeds to step 245.

A test is performed in step 245 to determine if the next virtual node can be allocated. If it is determined in step 245 that the next virtual node can be allocated, then program control proceeds to step 250 to allocate the virtual node. If it is determined in step 245 that the next virtual node cannot be allocated, program control ends.

A test is performed in step 255 to determine if one or more virtual links associated with the current virtual node need to be allocated (e.g., virtual links to connect the current virtual node to neighbor nodes). If it is determined in step 255 that one or more virtual links associated with the current virtual node need to be allocated, then program control proceeds to step 260. If it is determined in step 255 that there are no virtual links associated with the current virtual node that need to be allocated, program control returns to step 230 to process a next virtual node.

A test is performed in step 260 to determine if the one or more virtual links can be allocated. If it is determined in step 260 that the one or more virtual links can be allocated, then program control proceeds to step 265 to allocate the one or more virtual links. If it is determined in step 260 that the one or more virtual links cannot be allocated, program control ends.

As noted above, the network slice resource allocation process 200 employs: a virtual node sorting process 300, discussed further below in conjunction with FIG. 3, to sort the virtual nodes; a physical node sorting process 400, discussed further below in conjunction with FIG. 4, to sort the physical nodes; and a mapping process 500, discussed further below in conjunction with FIG. 5, that maps each virtual node and virtual link to a physical node and a physical link.

FIG. 3 illustrates exemplary pseudo code for a virtual node sorting process 300 that sorts each virtual node using one or more importance criteria, relative to other virtual nodes, in accordance with an illustrative embodiment. In the example of FIG. 3, the virtual node sorting process 300 finds the score for each virtual node according to equation (1). Given the scores, the virtual node sorting process 300 calculates the importance of each virtual node as described by equation (2). Then, the virtual node sorting process 300 orders the virtual nodes by importance in non-increasing order and assigns the most important virtual node as the root. Finally, the virtual node sorting process 300 traverses the graph, starting at the root, ordering its neighbors by their importance, then ordering the neighbors' neighbors, and so on.

FIG. 4 illustrates exemplary pseudo code for a physical node sorting process 400 in accordance with an illustrative embodiment. In the example of FIG. 4, the physical node sorting process 400 finds the score for each physical node according to equation (3). Given the scores, the physical node sorting process 400 then calculates the importance of each physical node as described by equation (4). Then, the physical node sorting process 400 orders the physical nodes by importance in non-increasing order and assigns the most important physical node as the root. Finally, the physical node sorting process 400 traverses the graph, starting at the root, ordering its neighbors by their importance, then ordering the neighbors' neighbors, and so on.

FIG. 5 illustrates exemplary pseudo code for a process 500 for mapping each virtual node and virtual link to a physical node and a physical link, respectively, in accordance with an illustrative embodiment. In the example of FIG. 5, the mapping process 500 leverages the sorting processes 300, 400 of FIGS. 3 and 4 by combining the first virtual node with the first physical node. The subsequent virtual nodes in the sorted list are allocated to the same physical node where its parent (e.g., the previous virtual node) was allocated, or to one of its neighbors, and so on. The possible neighbors are determined by the number of allowed hops $f$ from the current node.

If during this allocation process, the mapping process 500 does not find a feasible allocation for all virtual nodes, the mapping process 500 returns a null value. The mapping process 500 also maps the virtual links to a physical link or a path in the physical network. Link mapping considers link resource demands, such as bandwidth, and constraints, such as propagation delay and loss rate. If there is no link capable of meeting the network slice demand during the allocation process, the mapping process 500 returns a null value. Finally, given that all virtual nodes and virtual links were successfully mapped into the physical infrastructure, the mapping process 500 returns this mapping.

Figure 6:
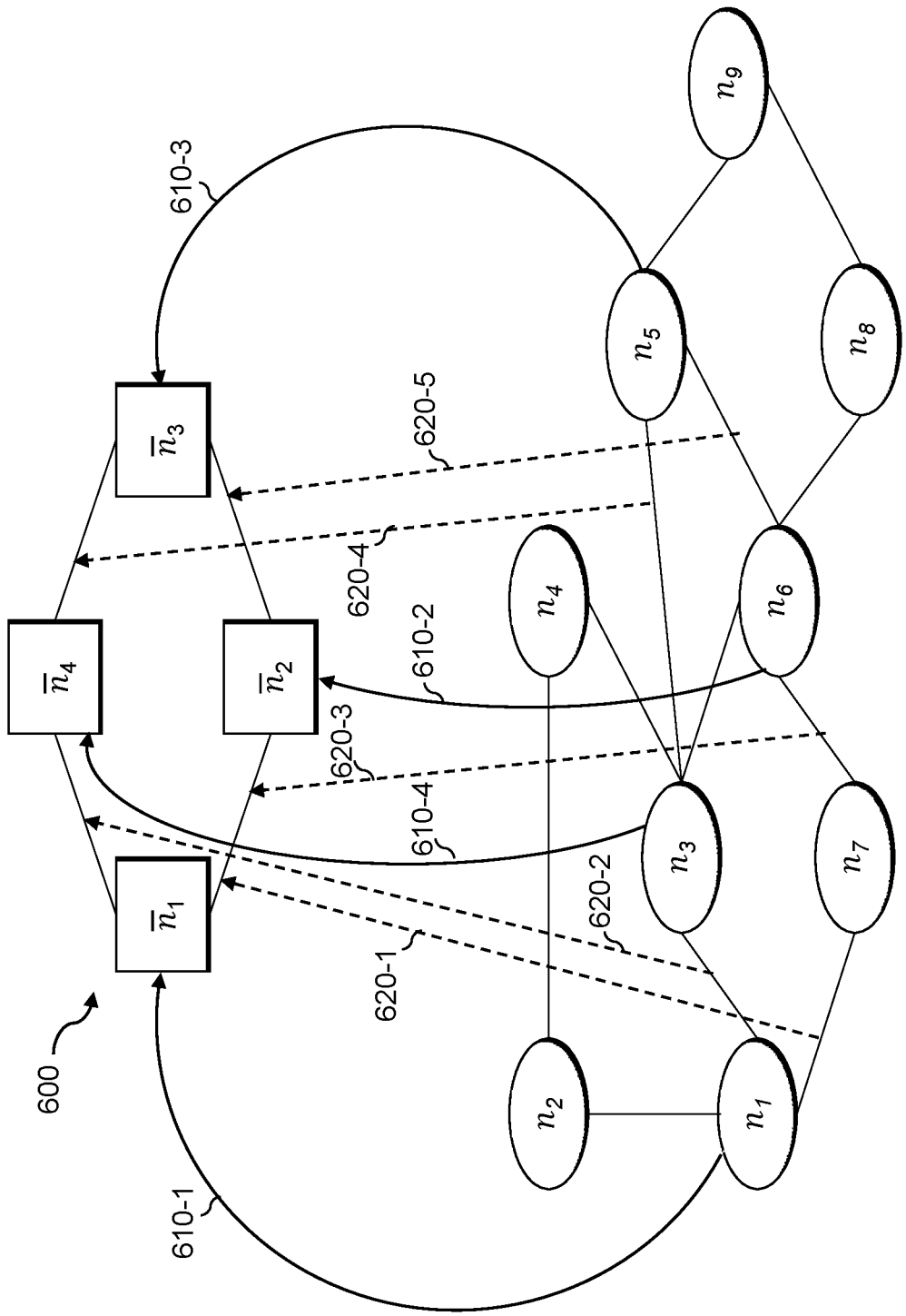
FIG. 6 illustrates an exemplary mapping of a physical network to a logical network in accordance with an illustrative embodiment.

FIG. 6 illustrates an exemplary mapping 600 of a physical network to a logical network in accordance with an illustrative embodiment. The mapping M provided as an output of the process 500 of FIG. 5 defines the relation between the virtual nodes of the network slice demand and the physical nodes of the infrastructure. In other words, such a mapping M denotes the one or more virtual nodes that should be allocated on each physical node. Furthermore, the mapping M specifies the path or the link in the physical network that should be used to deploy the virtual link specified in the network slice demand. This mapping information is used in the operation phase of the network slice life cycle, that creates the network slice instance and executes the continuous monitoring of the instance.

In the example of FIG. 6, a schematic diagram is provided representing the mapping 600 of a network slice demand onto a physical network infrastructure. The virtual node $\bar{n}_1$ is mapped to the physical node $n_1$, as shown by arrow 610-1, similarly the virtual nodes $\bar{n}_2$, $\bar{n}_3$ and $\bar{n}_4$ are mapped to the nodes $n_6$, $n_5$ and $n_3$, respectively, as shown by arrows 610-2, 610-3, 610-4, respectively. Furthermore, the virtual link $\bar{n}_1 \bar{n}_2$ is mapped to the physical path $(n_1 n_7, n_7 n_6)$, as shown by dashed arrows 620-1, 620-3, and the virtual links $\bar{n}_2 \bar{n}_3$, $\bar{n}_3$ $\bar{n}_4$ and $\bar{n}_1$ $\bar{n}_4$ are mapped into the physical links $n_6n_5$, $n_5n_3$ and $n_1n_3$, respectively, as shown by dashed arrows 620-5, 620-4, 620-2, respectively.

Figure 7:
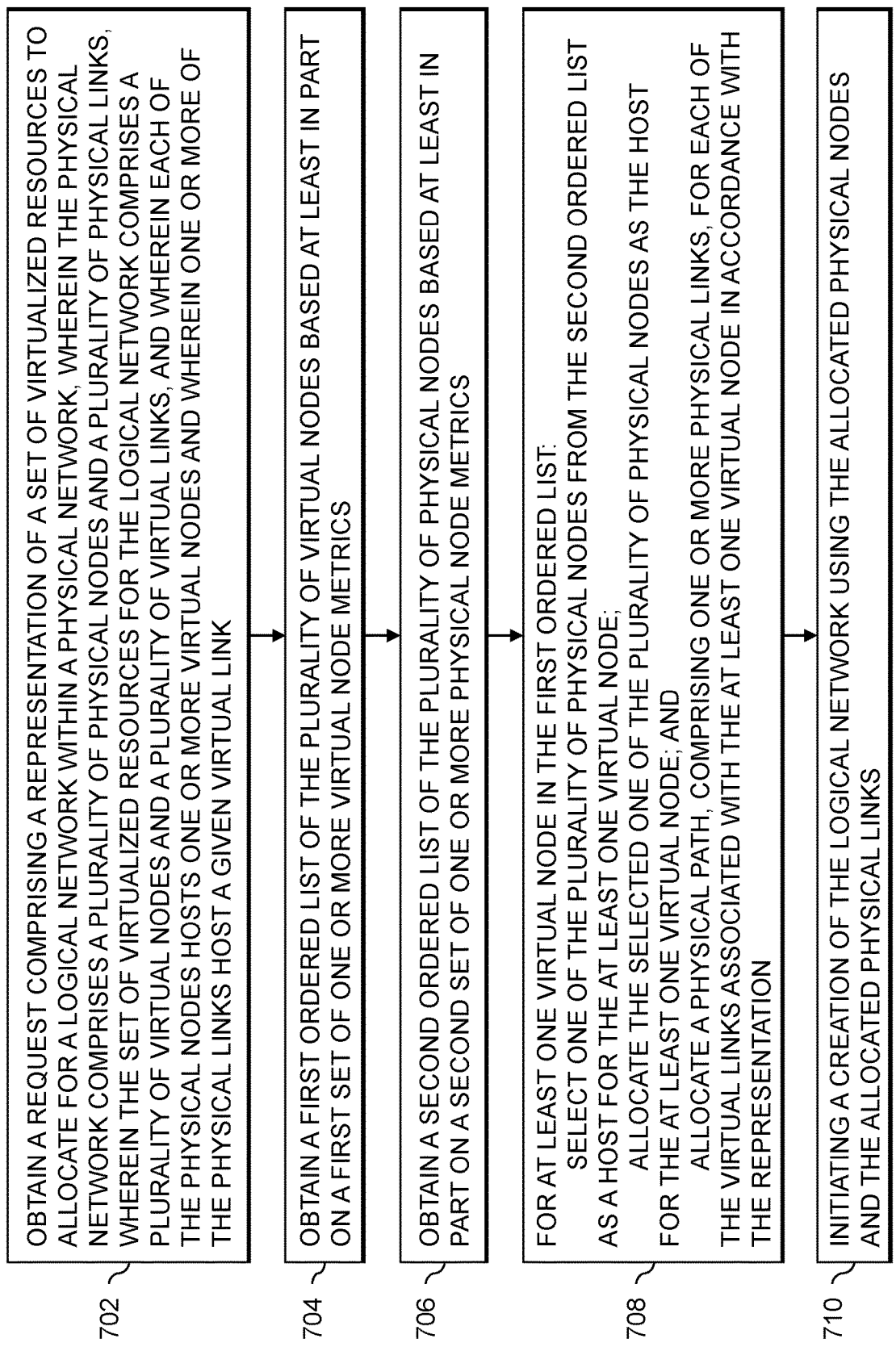
FIG. 7 is a flow chart illustrating an exemplary implementation of a process for logical network resource allocation and creation in accordance with an illustrative embodiment.

FIG. 7 is a flow chart illustrating an exemplary implementation of a process for logical network resource allocation and creation in accordance with an illustrative embodiment. In the example of FIG. 7, a request is obtained in step 702 comprising a representation of a set of virtualized resources to allocate for a logical network within a physical network, wherein the physical network comprises a plurality of physical nodes and a plurality of physical links, wherein the set of virtualized resources for the logical network comprises a plurality of virtual nodes and a plurality of virtual links, and wherein each of the physical nodes hosts one or more virtual nodes and wherein one or more of the physical links host a given virtual link.

A first ordered list of the plurality of virtual nodes is obtained in step 704 based at least in part on a first set of one or more virtual node metrics. A second ordered list of the plurality of physical nodes is obtained in step 706 based at least in part on a second set of one or more physical node metrics.

For at least one virtual node in the first ordered list, in step 708, the following steps are performed: selecting one of the plurality of physical nodes from the second ordered list as a host for the at least one virtual node; allocating the selected one of the plurality of physical nodes as the host for the at least one virtual node; and allocating a physical path, comprising one or more physical links, for each of the virtual links associated with the at least one virtual node in accordance with the representation.

A creation of the logical network is initiated in step 710 using the allocated physical nodes and the allocated physical links.

In one or more embodiments, the representation of the virtualized resources for the logical network comprises one or more of: an amount of one or more node resource types for each of the plurality of virtual nodes and wherein an amount of virtual node resources allocated in a given physical node does not exceed the amount of available resources in the given physical node; an amount of one or more link resource types for each of the plurality of virtual links and wherein an amount of virtual link resources allocated in a given physical link does not exceed an amount of available resources in the given physical link; a designated packet loss amount for each of the plurality of virtual links and wherein a packet loss associated with each of the allocated physical links does not exceed the designated packet loss amount; and/or a designated propagation delay amount for each of the plurality of virtual links and wherein a propagation delay associated with each of the allocated physical links does not exceed the designated propagation delay amount.

In at least some embodiments, the first set of one or more virtual node metrics comprises one or more of: (i) an amount of node resources needed for each of the plurality of virtual nodes, (ii) a degree metric for each of the plurality of virtual nodes, and (iii) a betweenness metric for each of the plurality of virtual nodes. The second set of one or more physical node metrics may comprise, for example, one or more of: (i) an amount of available resources associated with each of the plurality of physical nodes, (ii) a cost metric associated with each of the plurality of physical nodes, (iii) a degree metric associated with each of the plurality of physical nodes, and (iv) a centrality metric associated with each of the plurality of physical nodes.

In some embodiments, the degree metric for a given virtual node represents a number of neighboring nodes that connect to the given virtual node; and the betweenness metric for a given virtual node quantifies how often the given virtual node is found between a path linking other pairs of virtual nodes. The degree metric for a given physical node may be based at least in part on a number of neighboring physical nodes associated with the given physical node and the centrality metric for a given physical node may be based at least in part on a number of paths of a designated path type that pass through the given physical node.

In at least one embodiment, an infrastructure cost is reduced to host the logical network using an objective function that is based at least in part on a type and an amount of resources allocated for the logical network. The creation of the logical network may be independent of one or more service function chains that will utilize the logical network.

The particular processing operations and other functionality described in conjunction with FIGS. 2 through 5 and 7, for example, are presented by way of illustrative example only, and should not be construed as limiting the scope of the disclosure in any way. Alternative embodiments can use other types of processing operations for logical network resource allocation and creation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed techniques for logical network resource allocation and creation consider a cost of using a node in the resource allocation process in addition to the computing resources available at this node. In some embodiments of the disclosed resource allocation algorithm, the physical nodes of the network are sorted before the node mapping process to select the nodes with the lowest cost of use that also meet the demands of the network slice. The network topology may also be an important factor that can impact the selection of physical nodes. For example, selecting a non-central node of the physical network to allocate a virtual node may require many physical links to connect that node to the other physical nodes in the network slice. Nodes with a higher degree and betweenness may be frequently used, and many shortest paths (e.g., paths of a designated path type) pass through them. Therefore, the disclosed resource allocation algorithm, in some embodiments, combines the degree and centrality of nodes to measure a node importance in ordering the physical nodes. The physical node order may be based at least in part on a metric of importance, that considers the parameters mentioned above and the number of hops to the access node present in the coverage area demanded by the network slice. In this manner, the disclosed solution may take into account the heterogeneity of the physical network nodes, seeking to order the nodes according to their contribution to a more efficient and cost-effective selection of the resources that will compose the network slice.

The heterogeneity of the requested services in a network slice demand suggests that the virtual nodes may have different resource demands (e.g., a CPU demand and a RAM demand), that may be considered to calculate the node importance. In some embodiments of the disclosed resource allocation algorithm, the virtual nodes of the network slice request are sorted before the node mapping process to select the nodes with a lowest demand first.

The virtual network topology may also be an important factor that can impact the process of mapping the virtual network to the physical infrastructure. Virtual nodes with a higher degree and a betweenness may be frequently used, and many shortest paths pass through them. Hence, giving priority to the nodes with higher node importance may reduce link resource usage in the infrastructure network. Therefore, the disclosed resource allocation algorithm combines the degree and centrality of nodes to measure node importance in ordering virtual nodes, in at least some embodiments. After ordering the virtual nodes, the most important node can be selected as the root node in some embodiments. The exemplary mapping process then starts at the root node and proceeds from its neighbors using a breadth-first search.

In SFC-aware network slices, the SFC placement and network slice resource allocation may be closely related and dependent on each other. In static SFC placement scenarios, the same SFC placement algorithm may be used to also perform the network slice allocation process. In this scenario, all SFC types and requirements, as well as their relationship to each other is known beforehand, in order to start the network slice allocation process. This may not be the case for some practical service deployment scenarios. Another issue in SFC-aware network slices is that each new SFC to be placed may require a new network slice allocation process, causing an overhead of management processes.

In at least some embodiments, the disclosed techniques for network slice resource allocation and creation are SFC-agnostic (e.g., the SFC placement and network slice creation are independent of each other). Among other benefits, the SFC-agnostic approach better isolates each process, enabling the network slice resource allocation process to start even without the full knowledge of the SFCs that will be placed on it (only the types/classes of services). This is possible by designing a generic input in terms of a virtual network topology based on a network slice template, for a specific service type (e.g., eMBB, mMTC, URLLC).

In addition, the disclosed logical network resource allocation techniques may be employed for both static and dynamic SFC placement since the network slice is allocated before the SFCs are fully planned. The overhead for network slice allocation may be reduced even in scenarios where new SFC requests arrive dynamically, since the network slice is already allocated and may place several SFCs.

One or more embodiments of the disclosure provide improved methods, apparatus and computer program products for logical network resource allocation and creation. The foregoing applications and associated embodiments should be considered as illustrative only, and numerous other embodiments can be configured using the techniques disclosed herein, in a wide variety of different applications.

It should also be understood that the disclosed logical network resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for logical network resource allocation and creation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based logical network resource allocation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based logical network resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
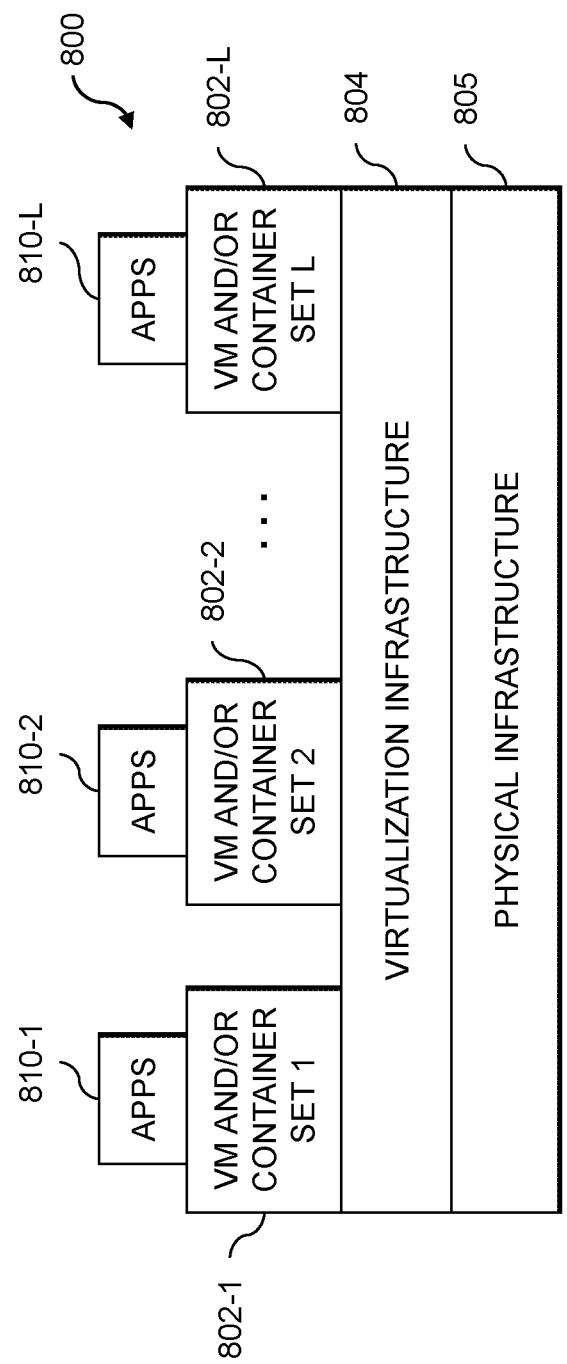
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide logical network resource allocation functionality of the type described above for one or more processes running on a given one of the VMs. For example, each of the VMs can implement logical network resource allocation control logic and associated logical network creation functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide logical network resource allocation functionality of the type described above for one or more processes running on different ones of the containers. For example, a container host device supporting multiple containers of one or more container sets can implement one or more instances of logical network resource allocation control logic and associated logical network creation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
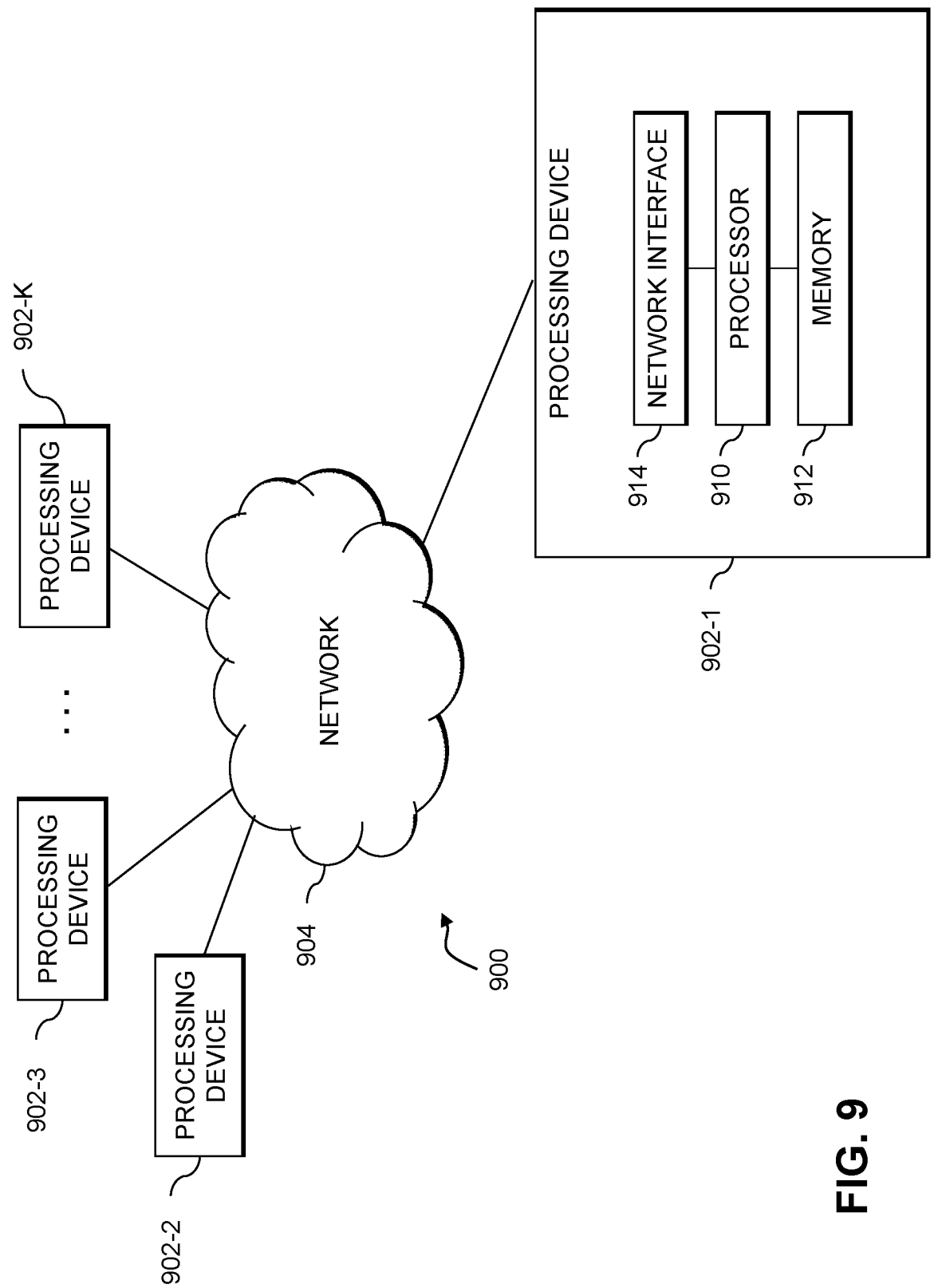
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a request comprising a representation of a set of virtualized resources to allocate for a logical network within a physical network, wherein the physical network comprises a plurality of physical nodes and a plurality of physical links, wherein the set of virtualized resources for the logical network comprises a plurality of virtual nodes and a plurality of virtual links, and wherein each of the physical nodes hosts one or more virtual nodes and wherein one or more of the physical links host a given virtual link;

obtaining a first ordered list of the plurality of virtual nodes, wherein the first ordered list is ordered based at least in part on a first set of one or more virtual node metrics;

obtaining a second ordered list of the plurality of physical nodes, wherein the second ordered list is ordered based at least in part on a second set of one or more physical node metrics, wherein the second set of one or more physical node metrics comprises a number of hops between a given physical node and an access node through which a user will access the physical network;

for at least one virtual node in the first ordered list:
  selecting one of the plurality of physical nodes from the second ordered list as a host for the at least one virtual node;
  allocating the selected one of the plurality of physical nodes as the host for the at least one virtual node; and
  allocating a physical path, comprising one or more physical links, for each of the virtual links associated with the at least one virtual node in accordance with the representation; and initiating a creation of the logical network using the allocated one of the plurality of physical nodes and the allocated one or more physical links of the physical path;

wherein the method is performed by at least one processing device comprising a processor coupled to a memory.

2. The method of claim 1, wherein the representation of the virtualized resources for the logical network comprises an amount of one or more node resource types for each of the plurality of virtual nodes and wherein an amount of virtual node resources allocated in a given physical node does not exceed the amount of available resources in the given physical node.

3. The method of claim 1, wherein the representation of the virtualized resources for the logical network comprises an amount of one or more link resource types for each of the plurality of virtual links and wherein an amount of virtual link resources allocated in a given physical link does not exceed an amount of available resources in the given physical link.

4. The method of claim 1, wherein the representation of the virtualized resources for the logical network comprises a designated packet loss amount for each of the plurality of virtual links and wherein a packet loss associated with each of the allocated one or more physical links does not exceed the designated packet loss amount.

5. The method of claim 1, wherein the representation of the virtualized resources for the logical network comprises a designated propagation delay amount for each of the plurality of virtual links and wherein a propagation delay associated with each of the allocated one or more physical links does not exceed the designated propagation delay amount.

6. The method of claim 1, wherein the first set of one or more virtual node metrics comprises one or more of: (i) an amount of node resources needed for each of the plurality of virtual nodes, (ii) a degree metric for each of the plurality of virtual nodes, or (iii) a betweenness metric for each of the plurality of virtual nodes.

7. The method of claim 6, wherein the degree metric for a given virtual node represents a number of neighboring nodes that connect to the given virtual node and wherein the betweenness metric for a given virtual node quantifies how often the given virtual node is found between a path linking other pairs of virtual nodes.

8. The method of claim 1, wherein the second set of one or more physical node metrics comprises one or more of: (i) an amount of available resources associated with each of the plurality of physical nodes, (ii) a cost metric associated with each of the plurality of physical nodes, (iii) a degree metric associated with each of the plurality of physical nodes, or (iv) a centrality metric associated with each of the plurality of physical nodes.

9. The method of claim 8, wherein the degree metric for a given physical node is based at least in part on a number of neighboring physical nodes associated with the given physical node and wherein the centrality metric for a given physical node is based at least in part on a number of paths of a designated path type that pass through the given physical node.

10. The method of claim 1, further comprising reducing an infrastructure cost to host the logical network using an objective function that is based at least in part on a type and an amount of resources allocated for the logical network.

11. The method of claim 1, wherein the creation of the logical network is independent of one or more service function chains that will utilize the logical network.

12. An apparatus comprising:

at least one processing device comprising a processor coupled to a memory;

the at least one processing device being configured to implement the following steps:

obtaining a request comprising a representation of a set of virtualized resources to allocate for a logical network within a physical network, wherein the physical network comprises a plurality of physical nodes and a plurality of physical links, wherein the set of virtualized resources for the logical network comprises a plurality of virtual nodes and a plurality of virtual links, and wherein each of the physical nodes hosts one or more virtual nodes and wherein one or more of the physical links host a given virtual link;

obtaining a first ordered list of the plurality of virtual nodes, wherein the first ordered list is ordered based at least in part on a first set of one or more virtual node metrics;

obtaining a second ordered list of the plurality of physical nodes, wherein the second ordered list is ordered based at least in part on a second set of one or more physical node metrics, wherein the second set of one or more physical node metrics comprises a number of hops between a given physical node and an access node through which a user will access the physical network;

for at least one virtual node in the first ordered list:
- selecting one of the plurality of physical nodes from the second ordered list as a host for the at least one virtual node;
- allocating the selected one of the plurality of physical nodes as the host for the at least one virtual node; and
- allocating a physical path, comprising one or more physical links, for each of the virtual links associated with the at least one virtual node in accordance with the representation; and initiating a creation of the logical network using the allocated one of the plurality of physical nodes and the allocated one or more physical links of the physical path.

13. The apparatus of claim 12, wherein the representation of the virtualized resources for the logical network comprises an amount of one or more node resource types for each of the plurality of virtual nodes and wherein an amount of virtual node resources allocated in a given physical node does not exceed the amount of available resources in the given physical node.

14. The apparatus of claim 12, wherein the representation of the virtualized resources for the logical network comprises an amount of one or more link resource types for each of the plurality of virtual links and wherein an amount of virtual link resources allocated in a given physical link does not exceed an amount of available resources in the given physical link.

15. The apparatus of claim 12, wherein the representation of the virtualized resources for the logical network comprises one or more of a designated packet loss amount for each of the plurality of virtual links and wherein a packet loss associated with each of the allocated one or more physical links does not exceed the designated packet loss amount and a designated propagation delay amount for each of the plurality of virtual links and wherein a propagation delay associated with each of the allocated one or more physical links does not exceed the designated propagation delay amount.

16. The apparatus of claim 12, further comprising reducing an infrastructure cost to host the logical network using an objective function that is based at least in part on a type and an amount of resources allocated for the logical network.

17. A non-transitory processor-readable storage medium having stored therein program code of one or more software programs, wherein the program code when executed by at least one processing device causes the at least one processing device to perform the following steps:

obtaining a request comprising a representation of a set of virtualized resources to allocate for a logical network within a physical network, wherein the physical network comprises a plurality of physical nodes and a plurality of physical links, wherein the set of virtualized resources for the logical network comprises a plurality of virtual nodes and a plurality of virtual links, and wherein each of the physical nodes hosts one or more virtual nodes and wherein one or more of the physical links host a given virtual link;

obtaining a first ordered list of the plurality of virtual nodes, wherein the first ordered list is ordered based at least in part on a first set of one or more virtual node metrics;

obtaining a second ordered list of the plurality of physical nodes, wherein the second ordered list is ordered based at least in part on a second set of one or more physical node metrics, wherein the second set of one or more physical node metrics comprises a number of hops between a given physical node and an access node through which a user will access the physical network;

for at least one virtual node in the first ordered list:
- selecting one of the plurality of physical nodes from the second ordered list as a host for the at least one virtual node;
- allocating the selected one of the plurality of physical nodes as the host for the at least one virtual node; and
- allocating a physical path, comprising one or more physical links, for each of the virtual links associated with the at least one virtual node in accordance with the representation; and initiating a creation of the logical network using the allocated one of the plurality of physical nodes and the allocated one or more physical links of the physical path.

18. The non-transitory processor-readable storage medium of claim 17, wherein the representation of the virtualized resources for the logical network comprises an amount of one or more node resource types for each of the plurality of virtual nodes and wherein an amount of virtual node resources allocated in a given physical node does not exceed the amount of available resources in the given physical node.

19. The non-transitory processor-readable storage medium of claim 17, wherein the representation of the virtualized resources for the logical network comprises an amount of one or more link resource types for each of the plurality of virtual links and wherein an amount of virtual link resources allocated in a given physical link does not exceed an amount of available resources in the given physical link.

20. The non-transitory processor-readable storage medium of claim 17, wherein the representation of the virtualized resources for the logical network comprises one or more of a designated packet loss amount for each of the plurality of virtual links and wherein a packet loss associated with each of the allocated one or more physical links does not exceed the designated packet loss amount and a designated propagation delay amount for each of the plurality of virtual links and wherein a propagation delay associated with each of the allocated one or more physical links does not exceed the designated propagation delay amount.

* * * * *